(12) United States Patent
Yielding et al.

(10) Patent No.: US 9,566,892 B2
(45) Date of Patent: Feb. 14, 2017

(54) MULTI-MATERIAL TANK TRAILER BODY

(71) Applicant: Heil Trailer International, Co., Cleveland, TN (US)

(72) Inventors: Bryan Yielding, Riceville, TN (US); Brian Polgrean, Ephrata, PA (US)

(73) Assignee: Heil Trailer International, Co., Cleveland, TN (US)

( * ) Notice: Subject to any disclaimer, the term of this patent is extended or adjusted under 35 U.S.C. 154(b) by 0 days.

(21) Appl. No.: 14/537,296

(22) Filed: Nov. 10, 2014

(65) Prior Publication Data
US 2016/0129826 A1    May 12, 2016

(51) Int. Cl.
*B60P 3/22* (2006.01)
(52) U.S. Cl.
CPC .................................. *B60P 3/2215* (2013.01)
(58) Field of Classification Search
CPC ...... B60P 3/2215; B65D 88/128; B65D 85/84; B65D 90/20
See application file for complete search history.

(56) References Cited

U.S. PATENT DOCUMENTS

| | | | | |
|---|---|---|---|---|
| 1,453,474 A | * | 5/1923 | Mauran | B61D 5/02 410/120 |
| 1,472,078 A | * | 10/1923 | Lucius | B60P 3/22 105/359 |
| 1,773,327 A | * | 8/1930 | Thwaits | B60P 3/22 280/838 |
| 1,946,834 A | * | 2/1934 | Brown | B60P 3/22 220/DIG. 24 |
| 1,951,741 A | * | 3/1934 | Smith | B60P 3/22 220/DIG. 24 |
| 2,026,501 A | * | 12/1935 | Jensen | B60P 3/22 220/564 |
| 2,056,179 A | * | 10/1936 | Fitch | B60P 3/22 280/838 |
| 2,567,164 A | * | 9/1951 | Brehany | B60P 3/2215 220/DIG. 24 |
| 2,700,622 A | * | 1/1955 | Burwell | B65D 85/84 118/65 |

(Continued)

OTHER PUBLICATIONS

Stainless Steel Composite Material, Mitshubishi Plastics, (http://www.alpolic.com) Apr. 2008.*

(Continued)

*Primary Examiner* — Kevin Hurley
*Assistant Examiner* — Gabriela C Craciun
(74) *Attorney, Agent, or Firm* — McGuireWoods LLP

(57) ABSTRACT

A tank trailer for transporting corrosive fluids is disclosed that includes a chassis and one or more cradle supports supporting a corrosion-resistant tank. The chassis is formed from a first material that is a high-strength material. The corrosion-resistant tank has a substantially cylindrical body and a plurality of ring supports, with each such ring support surrounding and reinforcing at least a portion of the cylindrical body. The ring supports may be formed from a material that is the same as, or similar to, the first material used to form the chassis. The first material and second material are joined at interfaces between (1) the cylindrical body and the cradle supports and (2) the cylindrical body and the ring supports. The interfaces comprise a third material that is compatible with the first material and the second material.

11 Claims, 3 Drawing Sheets

(56) References Cited

U.S. PATENT DOCUMENTS

| | | | | |
|---|---|---|---|---|
| 2,801,024 A * | 7/1957 | Osborne | B65D 85/84 | 220/62.12 |
| 3,163,435 A * | 12/1964 | Krueger | B60P 3/2225 | 182/90 |
| 3,650,501 A * | 3/1972 | Streb | B65D 90/12 | 220/1.5 |
| 3,779,421 A * | 12/1973 | Brown | B65D 85/84 | 220/581 |
| 4,345,861 A * | 8/1982 | Aarseth | B63B 25/12 | 105/358 |
| 4,395,052 A * | 7/1983 | Rash | B60P 3/2215 | 250/506.1 |
| 4,434,991 A * | 3/1984 | Winterton | B60P 3/2205 | 280/124.111 |
| 5,688,086 A * | 11/1997 | Menzemer | B65D 88/121 | 211/182 |
| 5,960,974 A * | 10/1999 | Kee | B65D 88/128 | 220/1.5 |
| 6,059,372 A * | 5/2000 | McDonald | B60P 1/56 | 298/27 |
| 6,382,446 B1 * | 5/2002 | Hinkle | B65D 88/128 | 220/1.5 |
| 6,401,983 B1 * | 6/2002 | McDonald | B60P 1/56 | 220/1.5 |
| 8,807,892 B2 * | 8/2014 | Spencer | B60P 3/2215 | 410/68 |
| 8,827,313 B2 * | 9/2014 | Haut | B62D 21/20 | 206/503 |
| 9,003,984 B2 * | 4/2015 | Blunier | A01B 59/048 | 111/118 |
| 2009/0223975 A1 * | 9/2009 | McCallister | B60P 3/221 | 220/563 |
| 2011/0162750 A1 * | 7/2011 | Marchand | C21D 9/08 | 138/134 |
| 2012/0085756 A1 * | 4/2012 | Beitler | B65D 88/128 | 220/1.5 |
| 2012/0128442 A1 * | 5/2012 | Wanek-Pusset | B65D 88/123 | 410/68 |
| 2013/0292387 A1 * | 11/2013 | Spencer | B60P 3/2245 | 220/562 |

OTHER PUBLICATIONS

Stainless Steel Comppsite Material, Mitsubishi Plastics, (http://www.alpolic.com) Apr. 2008.*

* cited by examiner
MULTI-MATERIAL TANK TRAILER BODY

BACKGROUND

Vehicular trailers are used to haul many types of cargo, including fluids. Such trailers may be attached to tractor trailers and used as shipping containers in larger freight operations, such as rail and ship-based transportation systems. Where the cargo being transported, a trailer may include a sealed tank that is attached to a frame. The tanks may be used to haul any variety of fluids, from dairy to petrochemicals. A portion of such fluids may be corrosive liquids. Examples of such corrosive liquids may include gasoline, solvents, and catalyst materials for use in industrial activities.

To accommodate corrosive liquids, tank trailers may have corrosion resistant properties, such as corrosion-resistant material compositions or coatings. Tank trailers that do not have such corrosion-resistant properties may experience significant degradation over time, compromising safety and longevity of the trailer. Typical tank trailers that are constructed to transport corrosive liquids include a tank trailer and frame crafted from a single, homogeneous material that is resistant to the otherwise corrosive properties of the liquids to be transported. Corrosive-resistant materials, however, may be relatively heavy and expensive in comparison to materials that are selected based on mechanical properties alone. Thus, conventional corrosion-resistant tank trailers are typically heavy and more expensive to build than tank trailers that are built to transport inert, non-corrosive materials.

BRIEF DESCRIPTION OF THE DRAWINGS

Illustrative embodiments of the present invention are described in detail below with reference to the attached figures, which are incorporated by reference herein, wherein.

Figure 1:
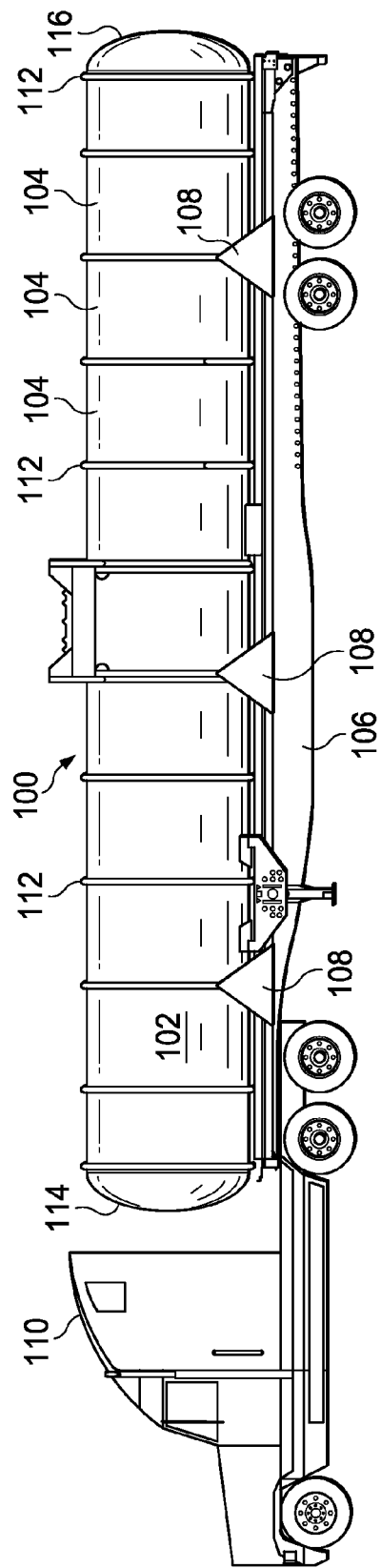
FIG. 1 is a schematic, side view of a truck having an attached tank trailer that is configured to transport corrosive liquids.

The illustrated figures are only exemplary and are not intended to assert or imply any limitation with regard to the environment, architecture, design, or process in which different embodiments may be implemented.

SUMMARY

In accordance with an illustrative embodiment, a trailer includes a frame having a base and a plurality of reinforcement members. The reinforcement members comprise a first material that is a high-strength material. The trailer further includes a tank that includes a second material that is a corrosion-resistant material. The first material and second material are joined at a plurality of locations by corrosion-resistant joints, which comprise a third material that is compatible with the first material and the second material.

In accordance with another illustrative embodiment, a tank trailer for transporting corrosive fluids includes a chassis and at least one cradle support for supporting a tank. The chassis includes a first material that is a high-strength material. The tank trailer also includes a tank comprising a substantially cylindrical body and a plurality of ring supports, each ring support surrounding and reinforcing at least a portion of the cylindrical body. The substantially cylindrical body includes a second, corrosion-resistant material and the ring supports include the first material. The one or more cradle supports are configured to receive and support the tank. The first material and second material are joined at the interfaces between the tank and the cradle supports and ring supports by joints that include a third material that is compatible with the first material and the second material.

In accordance with another illustrative embodiment, a process for fabricating a tank for transporting corrosive fluids includes forming a chassis and at least one reinforcement member for supporting a tank. The chassis and at least one reinforcement member include a first material that is a high-strength material. The process also includes providing a substantially cylindrical tank that includes a second, corrosion-resistant material. The at least one reinforcement member is configured to receive and support the substantially cylindrical tank. The first material and second material are joined at the reinforcement member by joints formed from a third material that is compatible with the first material and the second material.

DETAILED DESCRIPTION OF THE DRAWINGS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

As noted above, certain products that are transported by bulk tanks may be corrosive, and may damage or degrade shipping containers made of traditional materials. Such shipping containers may include tanks, such as trailer tanks that are typically used in rail systems or hauled by tractor trailers. Corrosive materials may include corrosive liquids, such as gasoline, acids, or chemicals used for refining or other industrial processes. In an embodiment, a tank trailer is described herein that includes a tank having corrosion resistant properties and other characteristics for use in hauling corrosive materials, including corrosive liquids.

For the purposes of illustration, the tank trailers, systems and methods described here are described with regard to a truck tank trailer, but may be similarly implemented in other mobile equipment, including truck-mounted tanks and other shipping containers. To maintain corrosion resistance, a portion of the barrel that forms the bulk tank body and that contacts the corrosive materials has corrosion-resistant properties, such as a coating or material composition that is highly resistant to corrosion, or a combination thereof. The bulk tank body may be included in a truck-mounted tank, a shipping container tank, or a tank that is configured for mounting to other mobile equipment.

Figure 2:
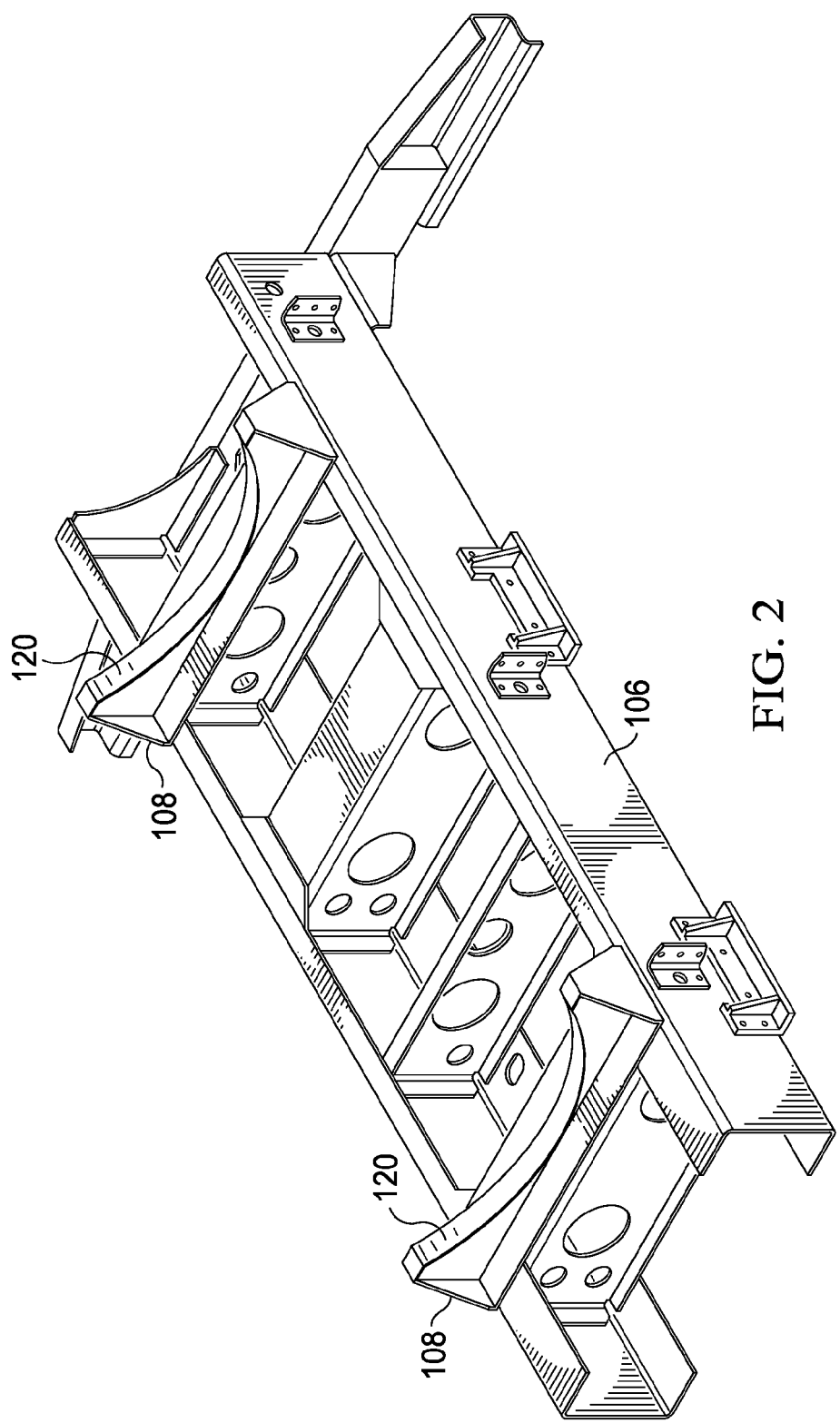
FIG. 2 is a schematic, plan view of a portion of the tank trailer of FIG. 1 that includes the trailer chassis.
Figure 3:
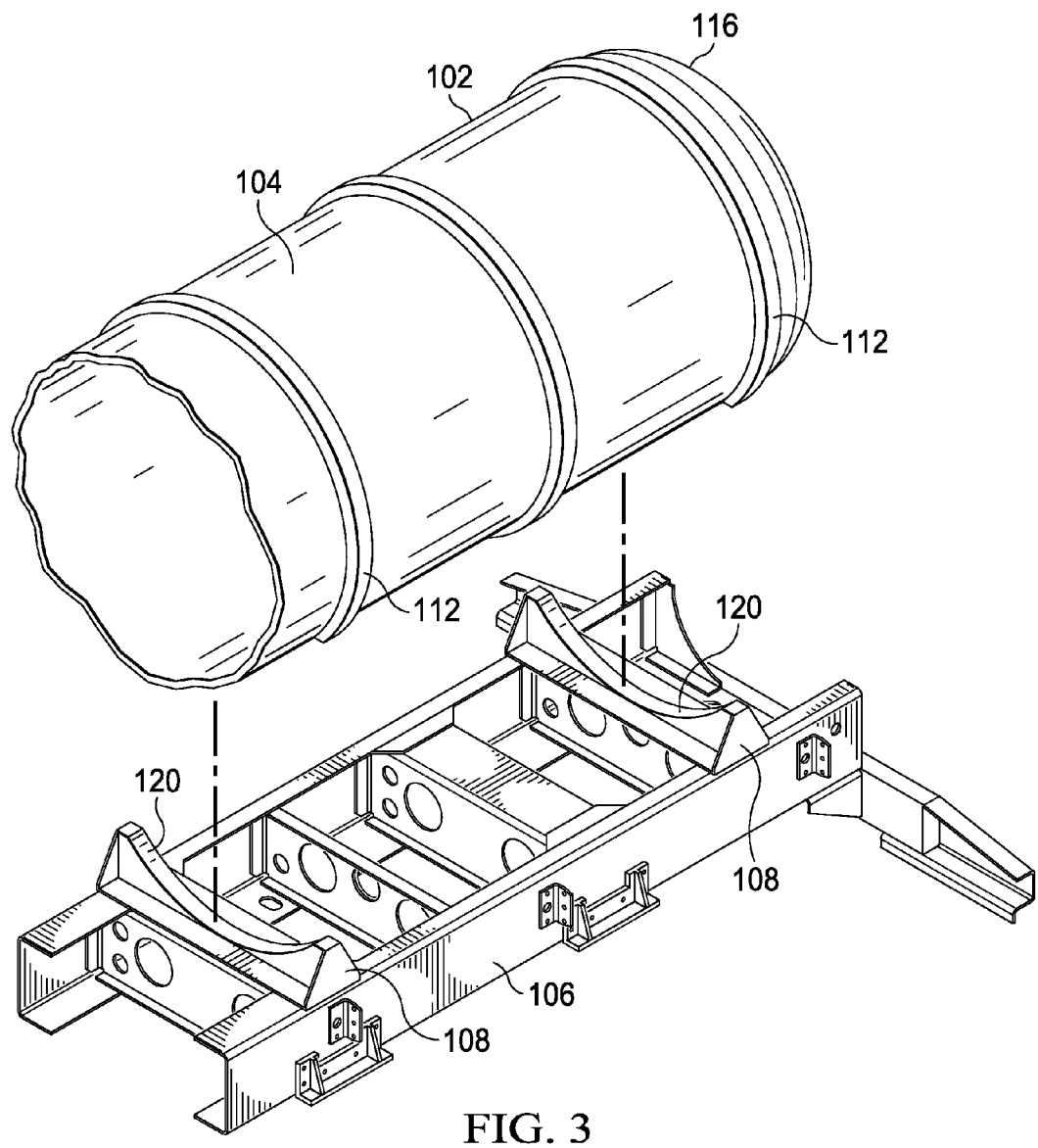
FIG. 3 is a partially exploded view showing a portion of the tank trailer in relation to the trailer chassis of FIG. 2.

Turning now to the FIGS. 1-3, FIG. 1 shows a schematic, side view of a tank trailer 100 attached to a truck 110 for towing. The tank trailer 100 may be constructed to transport corrosive fluids, such as gasoline, solvents, and catalyst materials for use in industrial activities. In an embodiment, the tank trailer 100 includes a tank body 102 formed by one or more barrel segments 104. The barrel segments 104 may be generally circular, oval, or any other suitable shape. As referenced herein, the term substantially cylindrical is intended to encompass trailer bodies having circular or oval cross-sections. The barrel segments 104 may be joined together by any suitable joining process, such as welding or sintering. To reinforce the tank body 102, reinforcing structures such as ring supports 112 may be joined to the tank body 102 at the locations of the joints between the barrel segments 104 or at other suitable locations. The ends of the tank body 102 may be enclosed by an a first head 114 and a second head 116, respectively, which are joined to the distal barrel segments 104 at each end of the tank body 102 using a joining process that is similar to or the same as the joining process used to join adjacent barrel segments 104 to each other. In an embodiment, the tank body 102 is attached to the chassis 106 of the trailer at a plurality of cradle supports 108 or other suitable attachment structures.

In an embodiment, the chassis 106 is a frame that is formed from a first material that is a high-strength, relatively lightweight material. An example of such a chassis 106 is shown in FIG. 2. The first material, for example, may be a high-strength carbon steel, or other suitable alloy that is supplied in tube, plate, or sheet form and used to fabricate the chassis 106. In an embodiment, the chassis 106 includes cradle supports 108 for receiving and supporting the load of the tank body 102. The cradle supports 108 may be formed from the same material as the chassis 106 and formed using similar manufacturing process (e.g., by welding or otherwise joining a high-strength, carbon steel structure to the chassis 106. The cradle supports 108 may have an arcuate upper surface 120 having a profile that is the same as, or complementary to, the profile of the outer surface of the tank body 102 such that the cradle supports 108 are configured to receive and geometrically mate to the tank body 102. In an embodiment, the cradle supports 108 and the tank body 102 may include aligning or positioning features, such as complementary grooves or notches that provide the ability to position the tank body 102 relative to the chassis 106 and provide an increased surface area at the joint between the tank body 102 and cradle supports 108. Such aligning features may be affixed to or formed integrally to one or both of the cradle supports 108 and tank body 102. In an embodiment, such aligning features may be included in the upper surface 120 of the cradle supports 108 and in the ring supports 112 of the tank body 102. For example, the cradle supports 108 may include a groove or channel that is sized and configure to receive a portion of a ring support 112 of the tank body 102.

The tank body 102 may be formed from one or more materials. In an embodiment, the barrel segments 104 and heads 114 and 116 that form the portion of the tank body 102 that contacts the material to be transported within the tank body 102 are formed from a second material that is different from the material used to form the chassis 106. The second material may be a corrosion-resistant material, such as stainless steel. Such stainless steel may include 304 stainless, 316 stainless, or a lean-duplex stainless, such as LDX 2101®.

As referenced herein, lean-duplex stainless steel includes alloys of chromium, nickel and molybdenum that are austenitic in nature. In an embodiment, such materials exhibit high strength and high-resistance to corrosion. In an embodiment, the second material may be any duplex stainless steel having a mixed microstructure of approximately equal proportions of austenite and ferrite, which may include in its composition chromium, nickel, molybdenum, or a combination thereof.

When assembled, the first material of the chassis 106 and cradle supports 108 may be joined to the second material of the barrel segments 104 of the tank body 102, or at one or more of the ring supports 112. In an embodiment, the interface between the first material and the second material is made by a third material, such as a welding flux that is inert relative to each of the first material and the second material. The joint may be formed using an inert gas welding process using, for example, an argon gas and a filler material made of a third alloy. The interface between the first material of the tank body 102 and the second material of the chassis 106 and cradle supports 108 may be a corrosion resistant joint that insulates the first material from the second material so that galvanic corrosion is not induced in either of the first material or second material if the tank trailer 100 is subject to wet or humid environments.

In an embodiment, the ring supports 112 are formed from a fourth material, which may be similar or identical to the first material (e.g., a high-strength carbon steel) or the second material (e.g., a corrosion-resistant material). Such ring supports 112 may be formed from tubing, plate, or sheet that is formed into ring members that surround the tank body 102. An inner surface of each ring support 112 may have a profile that is substantially identical to the profile of the outer surface of the tank body 102. In such an embodiment, the ring supports 112 are joined to the tank body 102 using, for example, an inert gas welding process that is compatible with the material that forms the tank body 102 and the material that forms the ring supports 112, similar to the joining technique described above for joining the tank body 102 to the chassis 106. In another embodiment, the ring supports 112 are formed from a fourth material that is similar or identical to the second material of the tank body 102.

In an illustrative embodiment, a tank trailer for transporting corrosive fluids includes a chassis and one or more cradle supports for supporting a tank body. The chassis is formed from a first material that is a high-strength material. The tank trailer further includes a tank having a substantially cylindrical body and a plurality of ring supports, with each such ring support surrounding and reinforcing at least a portion of the cylindrical body. The cylindrical body may be formed from one or more barrel segments that are joined together and sealed at each end by a head. The barrel segments and heads may be fabricated from a second material that is a corrosion-resistant material. The ring supports may be formed from a material that is the same as, or similar to, the first material used to form the chassis. In the illustrative embodiment, the one or more cradle supports are configured to surround and reinforce at least a portion of the cylindrical body. The first material and second material are joined at interfaces between (1) the cylindrical body and the cradle supports and (2) the cylindrical body and the ring supports. The interfaces comprise a third material that is compatible with the first material and the second material.

In another illustrative embodiment, a tank trailer for transporting corrosive fluids includes a chassis and one or more cradle supports for supporting a tank body. The chassis is formed from a first material that is a high-strength material. The tank trailer further includes a tank having a substantially cylindrical body and a plurality of ring supports, with each such ring support surrounding and reinforcing at least a portion of the cylindrical body. The cylindrical body may be formed from one or more barrel segments that are joined together and sealed at each end by a head. The barrel segments and heads may be fabricated from a second material that is a corrosion-resistant material. The ring supports may be formed from a material that is the same as, or similar to, the first material used to form the chassis. In the illustrative embodiment, the one or more cradle supports are configured to surround and reinforce at least a portion of the cylindrical body. The first material and second material are joined at interfaces between (1) the cylindrical body and the cradle supports and (2) the cylindrical body and the ring supports. The interfaces comprise a third material that is compatible with the first material and the second material. In this embodiment, the first material is a high-strength, carbon steel In another illustrative embodiment, a tank trailer for transporting corrosive fluids includes a chassis and one or more cradle supports for supporting a tank body. The chassis is formed from a first material that is a high-strength material. The tank trailer further includes a tank having a substantially cylindrical body and a plurality of ring supports, with each such ring support surrounding and reinforcing at least a portion of the cylindrical body. The cylindrical body may be formed from one or more barrel segments that are joined together and sealed at each end by a head. The barrel segments and heads may be fabricated from a second material that is a corrosion-resistant material. The ring supports may be formed from a material that is the same as, or similar to, the first material used to form the chassis. In the illustrative embodiment, the one or more cradle supports are configured to surround and reinforce at least a portion of the cylindrical body. The first material and second material are joined at interfaces between (1) the cylindrical body and the cradle supports and (2) the cylindrical body and the ring supports. The interfaces comprise a third material that is compatible with the first material and the second material. In this embodiment, the second material is 304 or 2205 stainless steel.

In another illustrative embodiment, a tank trailer for transporting corrosive fluids includes a chassis and one or more cradle supports for supporting a tank body. The chassis is formed from a first material that is a high-strength material. The tank trailer further includes a tank having a substantially cylindrical body and a plurality of ring supports, with each such ring support surrounding and reinforcing at least a portion of the cylindrical body. The cylindrical body may be formed from one or more barrel segments that are joined together and sealed at each end by a head. The barrel segments and heads may be fabricated from a second material that is a corrosion-resistant material. The ring supports may be formed from a material that is the same as, or similar to, the first material used to form the chassis. In the illustrative embodiment, the one or more cradle supports are configured to surround and reinforce at least a portion of the cylindrical body. The first material and second material are joined at interfaces between (1) the cylindrical body and the cradle supports and (2) the cylindrical body and the ring supports. The interfaces comprise a third material that is compatible with the first material and the second material. In this embodiment, the second material is a lean duplex stainless steel.

In another illustrative embodiment, a tank trailer for transporting corrosive fluids includes a chassis and one or more cradle supports for supporting a tank body. The chassis is formed from a first material that is a high-strength material. The tank trailer further includes a tank having a substantially cylindrical body and a plurality of ring supports, with each such ring support surrounding and reinforcing at least a portion of the cylindrical body. The cylindrical body may be formed from one or more barrel segments that are joined together and sealed at each end by a head. The barrel segments and heads may be fabricated from a second material that is a corrosion-resistant material. The ring supports may be formed from a material that is the same as, or similar to, the first material used to form the chassis. In the illustrative embodiment, the one or more cradle supports are configured to surround and reinforce at least a portion of the cylindrical body. The first material and second material are joined at interfaces between (1) the cylindrical body and the cradle supports and (2) the cylindrical body and the ring supports. The interfaces comprise a third material that is compatible with the first material and the second material. In this embodiment, the joint formed by the third material is a corrosion-resistant, inert gas weld comprising a weld flux that is non-reactive with the first material and the second material.

In another illustrative embodiment, a process for fabricating a tank trailer for transporting corrosive fluids includes forming a chassis and one or more reinforcement members for supporting a tank. The chassis is formed from a first material that is a high-strength material. The process also includes providing a cylindrical or oval tank comprising a second, corrosion-resistant material and one or more reinforcement members. The reinforcement members may be cradle supports or ring supports, which, in either case are configured to receive and support the cylindrical or oval tank. The process further includes joining the first material and second material at the interfaces between the reinforcement members and the cylindrical or oval tank using a third material that is compatible with the first material and the second material.

In another illustrative embodiment, a process for fabricating a tank trailer for transporting corrosive fluids includes forming a chassis and one or more reinforcement members for supporting a tank. The chassis is formed from a first material that is a high-strength material. The process also includes providing a cylindrical or oval tank comprising a second, corrosion-resistant material and one or more reinforcement members. The reinforcement members may be cradle supports or ring supports, which, in either case are configured to receive and support the cylindrical or oval tank. The process further includes joining the first material and second material at the interfaces between the reinforcement members and the cylindrical or oval tank using a third material that is compatible with the first material and the second material. In the embodiment, the reinforcement members comprise an arcuate surface that complements the outer surface of the tank.

In another illustrative embodiment, a process for fabricating a tank trailer for transporting corrosive fluids includes forming a chassis and one or more reinforcement members for supporting a tank. The chassis is formed from a first material that is a high-strength material. The process also includes providing a cylindrical or oval tank comprising a second, corrosion-resistant material and one or more reinforcement members. The reinforcement members may be cradle supports or ring supports, which, in either case are configured to receive and support the cylindrical or oval tank. The process further includes joining the first material and second material at the interfaces between the reinforcement members and the cylindrical or oval tank using a third material that is compatible with the first material and the second material. In the embodiment, the first material is a high-strength, carbon steel.

In another illustrative embodiment, a process for fabricating a tank trailer for transporting corrosive fluids includes forming a chassis and one or more reinforcement members for supporting a tank. The chassis is formed from a first material that is a high-strength material. The process also includes providing a cylindrical or oval tank comprising a second, corrosion-resistant material and one or more reinforcement members. The reinforcement members may be cradle supports or ring supports, which, in either case are configured to receive and support the cylindrical or oval tank. The process further includes joining the first material and second material at the interfaces between the reinforcement members and the cylindrical or oval tank using a third material that is compatible with the first material and the second material. In the embodiment, the second material is 304 or 2205 stainless steel.

In another illustrative embodiment, a process for fabricating a tank trailer for transporting corrosive fluids includes forming a chassis and one or more reinforcement members for supporting a tank. The chassis is formed from a first material that is a high-strength material. The process also includes providing a cylindrical or oval tank comprising a second, corrosion-resistant material and one or more reinforcement members. The reinforcement members may be cradle supports or ring supports, which, in either case are configured to receive and support the cylindrical or oval tank. The process further includes joining the first material and second material at the interfaces between the reinforcement members and the cylindrical or oval tank using a third material that is compatible with the first material and the second material. In the embodiment, the second material is a lean duplex stainless steel.

In another illustrative embodiment, a process for fabricating a tank trailer for transporting corrosive fluids includes forming a chassis and one or more reinforcement members for supporting a tank. The chassis is formed from a first material that is a high-strength material. The process also includes providing a cylindrical or oval tank comprising a second, corrosion-resistant material and one or more reinforcement members. The reinforcement members may be cradle supports or ring supports, which, in either case are configured to receive and support the cylindrical or oval tank. The process further includes joining the first material and second material at the interfaces between the reinforcement members and the cylindrical or oval tank using a third material that is compatible with the first material and the second material. In the embodiment, the third material forms corrosion-resistant joints that are non-reactive with the first material and second material.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

It should be apparent from the foregoing that an invention having significant advantages has been provided. While the invention is shown in only a few of its forms, it is not limited to only these embodiments but is susceptible to various changes and modifications without departing from the spirit thereof. For example, the tank body described above may instead be a truck-mounted tank, a shipping container tank or a tank configured for mounting to other mobile equipment.

We claim:

1. A tank trailer for transporting corrosive fluids comprising:
   a chassis and at least one cradle support for supporting a tank, the chassis and cradle support comprising a first material that is a high-strength material; and
   a tank comprising cylindrical body and a plurality of supporting rings, each ring surrounding and reinforcing at least a portion of the cylindrical body, the cylindrical body comprising a second, corrosion-resistant material and the supporting rings comprising the first material;
   wherein the at least one cradle support is configured to receive and support the cylindrical tank; and
   wherein the first material and second material are joined at interfaces comprising a third material that is compatible with the first material and the second material, the interfaces comprising inert gas welds joining the cradle support to the tank.

2. The tank trailer of claim 1, wherein the first material is a high-strength, carbon steel.

3. The tank trailer of claim 1, wherein the second material is 304 or 2205 stainless steel.

4. The tank trailer of claim 1, wherein the second material is a lean duplex stainless steel.

5. The tank trailer of claim 1, wherein the inert gas welds comprise a third material that is non-reactive with the first material and second material.

6. A process for fabricating a tank for transporting corrosive fluids comprising:
   forming a chassis and at least one reinforcement member for supporting a tank, the chassis comprising a first material that is a high-strength material; and
   providing a cylindrical tank comprising a second, corrosion-resistant material;
   wherein the at least one reinforcement member is configured to surround and reinforce at least a portion of the cylindrical tank;
   wherein the first material and second material are joined at the reinforcement member by joints comprising a third material that is compatible with the first material and the second material, the joints comprising inert gas welds joining the cradle reinforcement member and the cylindrical tank.

7. The process of claim 6, wherein the reinforcement members comprise a cradle having an arcuate surface.

8. The process of claim 6, wherein the reinforcement members comprise a ring support.

9. The process of claim 6, wherein the first material is a high-strength, carbon steel.

10. The process of claim 6, wherein the second material is 304 or 2205 stainless steel.

11. The process of claim 6, wherein the second material is a lean duplex stainless steel.

* * * * *